(12) United States Patent
Arito et al.

(10) Patent No.: US 6,586,484 B1
(45) Date of Patent: Jul. 1, 2003

(54) PHENOL FOAM

(75) Inventors: Yuuichi Arito, Kawasaki (JP); Kenji Takasa, Yokosuka (JP); Thumoru Kuwabara, Yokosuka (JP)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/581,300

(22) PCT Filed: Dec. 9, 1998

(86) PCT No.: PCT/US98/26060

§ 371 (c)(1),
(2), (4) Date: Aug. 17, 2000

(87) PCT Pub. No.: WO99/29764

PCT Pub. Date: Jun. 17, 1999

(30) Foreign Application Priority Data

Dec. 10, 1997 (JP) .............................................. 9-339797

(51) Int. Cl.⁷ .................................................. C08J 9/14
(52) U.S. Cl. ............................ 521/94; 521/98; 521/129; 521/131; 521/181
(58) Field of Search ............................ 521/94, 129, 98, 521/181, 131

(56) References Cited

U.S. PATENT DOCUMENTS

| 4,303,758 A | * | 12/1981 | Gusmer et al. |
| 4,444,912 A | * | 4/1984 | Carlson et al. |
| 5,481,027 A | * | 1/1996 | Kirchner |
| 5,509,939 A | * | 4/1996 | Kirchner |

* cited by examiner

*Primary Examiner*—Morton Foelak
(74) *Attorney, Agent, or Firm*—Inger H. Eckert; Stephen W. Barns

(57) ABSTRACT

To provide a type of phenol foam characterized by the fact that the phenol foam is formed by using a hydrocarbon as the foaming agent. The phenol foam has excellent heat-insulating performance, high compressive strength and other mechanical strengths, improved brittleness and is friendly to the environment of the earth.

3 Claims, No Drawings

PHENOL FOAM

TECHNICAL FIELD

This invention pertains to a type of phenol foam which can be used preferably for heat insulation as various materials for construction.

BACKGROUND ART

Among various types of organic resin foams, the phenol foam has excellent fire-retarding property, high heat resistance, low fuming property, high dimensional stability, high solvent resistance, and good processability. Consequently, it is widely used in various types of construction materials. Usually, the phenol foam is manufactured by blending the resol resin, which is prepared by condensation of phenol and formalin in the presence of an alkaline catalyst, with foaming agent, surfactant, curing catalyst, and other additives homogeneously, followed by foaming.

For the conventional phenol foam, the foaming agents that can be used include trichlorotrifluoroethane (CFC-113), trichloromonofluoromethane (CFC-11), dichlorotrifluoroethane (HCFC-123), dichlorofluoroethane (HCFC-141b), and other halogenated hydrocarbons and their derivatives. For these types of halogenated hydrocarbons and their derivatives for use as a foaming agent, the safety in manufacturing is high, and the thermoconductivity of the gas itself is low, so that the thermal conductivity of the obtained foam is also low. This is an advantage. However, at present, it has become clear that CFC-113, CFC-11, and other chlorine atom-containing substances can decompose ozone in the stratosphere and damage ozone in the ozonosphere, and the damages of these substances on the environment of the earth have become a world problem. Consequently, their manufacturing and use are under control in the world. Also, even for fluorohydrocarbons 1,1,1,2-tetrafluoroethane (HFC-134a), 1,1-difluoroethane (HFC-152a), etc., free of chlorine and having null ozone-damaging coefficient, as they have relatively high earth greenhouse effect coefficients, it seems that their use might be restricted in Europe. Consequently, pentane and other hydrocarbons have come under spotlight (as a substitute).

In the past, it was known that n-pentane and cyclopentane may be used as a foaming agent for the phenol foam. However, although these hydrocarbons do not harm the ozonosphere and have relatively small earth greenhouse effect coefficients compared with the halogenated hydrocarbons, the average pore size of the foam formed becomes larger, the thermal conductivity of the gas itself is high so that no good heat-insulating performance can be realized, and the pore walls are weak and the compressive strength and other mechanical strengths are also insufficient. These are troubles that hamper their practical applications.

In this respect, Japanese Tokuhyo Patent No. Hei 4[1992]-503829 disclosed a method for manufacturing phenol foam with even lower thermal conductivity by using a mixture of a prescribed type of fluoroalkane (referred to as PFA hereinafter) and alkane or cycloalkane as the foaming agent. However, the fluoroalkane also has a relatively large earth greenhouse effect coefficient just as the aforementioned fluorohydrocarbon, so that its use may also be restricted.

Also, Japanese Kokai Patent Application No. Hei 3[1991]-231940 disclosed a method for manufacturing a phenol foam by using polyfluorotrialkylamine as the foaming agent. However, although perfluorotrialkylamine has a low thermal conductivity of the gas itself and a relatively small coefficient of the earth greenhouse effect, it has been found by the present inventors that when phenol foam is test-made by using perfluorotrialkylamine having methyl or ethyl as the fluorocarbon in the molecules, the cell size of the formed phenol foam becomes larger so that the heat-insulating performance is not good, the rigidity of the phenol foam becomes lower, and the compressive strength and other mechanical strengths of the foam are lower. On the other hand, when the phenol foam is test-made by using perfluorotrialkylamine having butyl or other fluorocarbon having an even higher boiling point as the foaming agent at a foaming temperature of 100° C. or lower, good foaming cannot be achieved, and satisfactory phenol foam cannot be formed.

DISCLOSURE OF INVENTION

The purpose of this invention is to solve the aforementioned problems of the conventional technology. That is, the purpose of this invention is to provide a type of phenol foam which is manufactured using a hydrocarbon as the foaming agent, and which has excellent heat-insulating performance, high compressive strength and other mechanical strengths, improved brittleness, and is friendly to the environment of the earth.

Means to Solve the Problems

To realize the aforementioned purpose, the present inventors have performed extensive research. As a result of this research, a type of phenol foam meeting the aforementioned requirements was discovered, and this invention was reached.

That is, this invention provides the following type of phenol resin foam heat-insulating material:

1. A type of phenol resin foam heat-insulating material, characterized by the following facts: the phenol foam has an independent porosity of at least 80%, an average pore size in the range of 10–400 mm, and a thermal conductivity of 0.025 kcal/mhr° C. or lower; the phenol foam is composed of a portion of pores filled with a gas containing $C_{4-6}$ saturated hydrocarbon and a resin portion made of a phenol resin containing 0.01–5 wt % of at least one type of fluoroamine represented by the following formula (1):

$$(C_aF_b)_3N \tag{1}$$

In formula (1), a is a natural number of 4 or larger and b is 2a+1.

2. The phenol resin foam heat-insulating material described in claim 1, characterized by the fact that the weight of the gas filled in the portion of pores is in the range of 2–35 wt % of phenol foam.

3. The phenol foam described in claim 1 or 2, characterized by the fact that the phenol foam has a density in the range of 10–70 kg/m³, a brittleness of 30% or smaller, and a compressive strength meeting the relationship shown in formula (2) with respect to the density:

$$\text{compressive strength (kg/cm}^2\text{)} \geq \text{density (kg/m}^3\text{)} \times 0.1164 - 2.5 \tag{2}.$$

In the following, this invention will be explained in more detail.

The phenol foam of this invention is composed of a portion of pores filled with a gas and a resin portion made of walls of pores and the base material. For the phenol foam of this invention, the independent porosity has to be at least 80%, or preferably at least 85%, or more preferably 90%. If the independent porosity is lower than 80%, the foaming agent of the phenol foam may be substituted with air, so that the heat-insulating performance deteriorates significantly over time. Also, the brittleness of the surface of the foam becomes more serious, so that the mechanical properties of the foam may not be able to meet the demand for the practical applications.

For the phenol foam of this invention, the average pore size should be in the range of 10–400 mm, or preferably in the range of 20–200 mm. If the average pore size is smaller than 10 mm, as there is a limit to the thickness of the pore walls, the foam density naturally rises. As a result, the heat transfer proportion of the resin portion in the foam rises, and the heat-insulating performance of the phenol foam may become insufficient. On the other hand, if the average pore size becomes larger than 400 mm, the beat transfer due to radiation rises, and the heat-insulating performance of the foam also may deteriorate.

In the phenol foam of this invention, $C_{4-6}$ alkane or cycloalkane is used as the foaming agent, that is, the gas to fill in the portion of pores. Examples include n-butane, isobutane, n-pentane, isopentane, cyclopentane, neopentane, n-hexane, isohexane, 2,2-dimethylbutane, 2,3-dimethylbutane, cyclohexane, etc. Among them, n-butane, isobutane, n-pentane, isopentane, cyclopentane, neopentane, and other butanes and pentanes are preferred in this invention. According to this invention, it is also possible to make use of a mixture of two or more types of hydrocarbons. Examples of the mixtures that can be used include a mixture of n-pentane and n-butane, a mixture of isobutane and isopentane, a mixture of n-butane and isopentane, a mixture of isobutane and n-pentane, a mixture of cyclopentane and n-butane, a mixture of cyclopentane and isobutane, etc. Also, it is possible to make use of nitrogen, helium, argon, air, or other low-boiling-point substances as foaming nuclei dissolved in the foaming agent for use. The amount of the foaming agent used in this invention may be selected appropriately according to the desired foam density, foaming conditions, etc. Usually, with respect to 100 parts by weight of the resin, the amount of the foaming agent should be in the range of 3–40 parts by weight, or preferably in the range of 5–20 parts by weight.

According to this invention, fluoroamine has to be contained in the resin portion of the phenol foam, and it is substantially not present in the form of a gas. More specifically, in the quantitative determination method of the foaming agent to be explained later, the amount of fluoroamine detected is 0.001 wt % or smaller. In this invention, the types of fluoroamine that can be used preferably include the following products of Sumitomo 3-M Co., Ltd.: Fluorinate [transliteration] FC-43 (triperfluorobutylamine), FC-70 (triperfluoroamylamine), FC-71 (triperfluorohexylamine), etc.

The amount of fluoroamine used in this invention with respect to the phenol foam should be in the range of 0.01–5 wt %, or preferably in the range of 0.05–3 wt %. If the proportion of fluoroamine is less than 0.01 wt %, it is impossible to realize a high independent porosity. On the other hand, if the proportion of fluoroamine is over 5 wt %, the manufacturing cost is boosted, and this is undesired from the economical viewpoint. Also, in this case, fluoroamine is deposited on the wall surfaces of the pores, leading to deterioration in the heat-insulating performance, and the rigidity of the resin may also decrease.

Fluoroamine in this invention has a high boiling point, and hence it has no foaming function as a foaming agent. Consequently, when fluoroamine is used alone as the foaming agent, no foaming takes place at all. However, in this invention, fluoroamine and a foaming agent coexist in the foaming process for forming the phenol foam. Consequently, the portion of pores and the portion of resin of the phenol foam can be well formed. That is, in this invention, by using a hydrocarbon as the foaming agent and making fluoroamine coexisting in the foaming operation, it is possible to have a small pore size and, at the same time, to realize a high independent porosity for the phenol foam. Consequently, for the phenol foam of this invention, the heat-insulating performance can be improved significantly. For the phenol foam of this invention, while a hydrocarbon is used as a foaming agent, the thermal conductivity is still 0.025 kcal/mhr° C. or lower. That is, it has excellent heat-insulating performance. More preferably, the thermal conductivity is 0.020 kcal/mhr° C. or lower.

In addition, as fluoroamine used in this invention has a high boiling point, even when it is released into the atmosphere, the coefficient of the earth greenhouse effect is so small that there is little effect. Consequently, it is friendly to the environment of the earth.

The density of the phenol foam of this invention may be selected appropriately depending on the proportion of the foaming agent, the temperature of the oven for curing, and other foaming conditions. The density of the phenol foam of this invention should be in the range of 10–70 kg/m$^3$, or preferably in the range of 20–50 kg/m$^3$. If the density is lower than 10 kg/m$^3$, the compressive strength and other mechanical strengths of the phenol foam is low, it is prone to damage when the phenol foam is handled, and the surface brittleness also increases. On the other hand, if the density is higher than 70 kg/m$^3$, the heat transfer of the resin portion is increased, and the heat-insulating performance of the resin portion may deteriorate.

The phenol foam of this invention has its brittleness and compressive strength improved as compared with the conventional phenol foam. Although the detailed reason is not yet clear, it is believed that, due to coexistence of fluoroamine and the foaming agent in the foaming operation, foaming takes place more uniformly and at better timing, so that the pore size of the obtained phenol foam becomes smaller and the resin structure for forming the pores itself becomes stronger by these compounds. Within the aforementioned density range, the phenol foam of this invention has a brittleness determined, using the measurement method to be explained later, of 30% or smaller, or preferably 20% or smaller. If the brittleness is larger than 30%, the amount of the resin dust cut from the foam surface becomes larger, leading to deterioration in the operability in the operation, and tendency toward damage of the products during handling in transportation, operation, etc. Due to these troubles, the phenol foam is hard to use in practical applications.

It is preferred that the compressive strength of the phenol foam of this invention meet the relationship with density represented by said formula (2). Said formula (2) shows that for the phenol foam of this invention, the compressive strength with respect to the density is higher than the conventional type of phenol foam. The brittleness and compressive strength are closely related to the independent porosity, average pore size, and density of the phenol foam, as well as the strength of the resin itself. In particular, it depends significantly on the density.

In the phenol foam prepared using the hydrocarbon as the foaming agent in this invention, presence of fluoroamine is believed to be the reason that makes the average pore size smaller than that of the conventional phenol foam, makes the strength of the resin higher, and makes the balance between the compressive strength with respect to the density and the brittleness better for the phenol foam.

In the following, explanation will be made on the method for manufacturing the phenol foam of this invention.

The resol resin for use as the resin feed material is prepared by polymerization of phenol and formalin as the feed materials in the presence of an alkaline catalyst and heating at a temperature in the range of 40–100° C. The resol resin may also be doped with the various types of modifiers, such as urea, amines, amides, epoxy compounds, monosaccharides, starches, Poval resin, furan resin, polyvinyl alcohol, lactones, etc., for use. When urea modification is to be performed, it is possible to add urea during resol resin polymerization, or to mix urea, which has been methylolated by an alkaline catalyst beforehand, in the resol resin. For the resol resin composition, the viscosity is adjusted appropriately by adjusting the water content. The appropriate viscosity of the resin composition depends on the foaming conditions. Usually, the viscosity at 40° C. is preferably in the range of 1000–50,000 cps, or preferably in the range of 2000–30,000 cps.

The resol resin composition with its viscosity adjusted to an appropriate value, as well as foaming agent, fluoroamine, surfactant, and curing agent, is fed into a mixer, and these are homogeneously mixed to form a foaming composition. In this case, it is possible to premix the surfactant with the resin and then to feed the mixture into the mixer, or to feed them separately into the mixer. There is no special limit on the method to feed fluoroamine in this invention. For example, any of the following methods may be adopted to feed the fluoroamine when it is to be mixed with the resin: the method in which fluoroamine is fed together with the resin into the mixer, the method in which fluoroamine is fed together with the curing catalyst into the mixer, the method in which fluoroamine is fed together with the foaming agent, and the method in which fluoroamine is fed separately into the mixer. Among them, the method in which fluoroamine of this invention is premixed with the foaming agent and the mixture of fluoroamine and foaming agent is then fed into the mixer is preferred, as it can display the desired effect in a relatively small amount. When fluoroamine is premixed with the foaming agent, the proportion of fluoroamine with respect to the foaming agent should be in the range of 0.2–20 wt %. When fluoroamine is mixed with the foaming agent, if the amount of fluoroanine with respect to the foaming agent is less than 0.2 wt %, the effect cannot be displayed. On the other hand, if this amount is over 20 wt %, the heat-insulating performance and mechanical strengths of the phenol foam might deteriorate. The amount of fluoroamine with respect to the foaming agent is preferably in the range of 0.5–15 wt %, or more preferably in the range of 1–10 wt %. Also, when the curing catalyst is premixed with the resol resin, the curing reaction takes place before foaming, and a good foam cannot be obtained. Consequently, it is preferred that the resol resin and the foaming agent be mixed by a mixer. The foaming composition prepared by mixing in the mixer is blown into a mold, etc., and heat treatment is performed to complete the foaming curing process. In this way, the phenol foam of this invention is formed.

Examples of the curing catalysts that can be used in foaming and curing in this invention include toluenesulfonic acid, xylenesulfonic acid, benzenesulfonic acid, phenolsulfonic acid, styrene sulfonic acid, naphthalenesulfonic acid, and other aromatic sulfonic acids, which may be used either alone or as a mixture of several types. It is also possible to add curing agents, such as resorcinol, cresol, saligenin (o-methylolphenol), p-methylolphenol, etc. Also, these curing catalysts may be diluted with diethylene glycol, ethylene glycol, or other solvent.

The conventional types of surfactant may be used in this invention. Among them, nonionic surfactants are effective, such as alkylene oxide as a copolymer of ethylene oxide and propylene oxide; condensation product of alkylene oxide and castor oil; condensation product of alkylene oxide and nonylphenol, dodecylphenol, or other alkylphenol; as well as polyoxyethylene fatty acid ester and other fatty acid esters; polydimethylsiloxane and other silicone compounds; polyalcohols, etc. These surfactants may be used either alone or as a mixture of several types. There is no special limit on the amount used. Usually, in this invention, for 100 parts by weight of the resol resin, the amount of the surfactants should be in the range of 0.3–10 parts by weight.

In the following, explanation will be made on the methods to evaluate the configuration, structure, and characteristics of the phenol foam of this invention.

The independent porosity is measured as follows. From the formed phenol foam, a cylindrical specimen with diameter of 35–36 mm and height of 30–40 mm is cut out by a cork borer. For the specimen, the volume is measured by an air comparison-type specific gravity meter Model 1000 (product of Tokyo Science Co., Ltd.) according to the standard use method. From the volume of the sample, the volume of the pore walls calculated from the weight of the sample and the resin density is subtracted. The result is divided with the apparent volume calculated from the external dimensions of the specimen to give the independent porosity. The measurement is performed according to ASTM D2856. According to this invention, the density of the phenol resin is 1.27 g/cm$^3$.

The average pore size of the phenol foam of this invention is measured as follows. On a 50× photograph of the cross-section of the foam, four 9-cm-long straight lines are drawn, and the average value of the number of the pores traversing each straight line is divided with 1800 mm to give the average pore size. It is the average value of the cell number measured according to JIS K 6402.

The thermal conductivity is measured by using a 200-mm-square sample of the phenol foam according to JIS A 1412 "Flat-plate thermal flux meter method" with the lower-temperature plate at 5° C. and with the higher-temperature plate at 35° C.

The density is measured for a 20-cm-square specimen of the phenol foam. It is derived by measuring the weight and apparent volume, excluding the surface material and siding material of the specimen, and it is measured according to JIS K 7222.

In the test of brittleness, 12 cubes with edge length of 25±15 mm are cut out such that the molding skin or surface material on one surface is included. If the thickness of the foam is smaller than 25 mm, the thickness of the specimen is taken as the thickness of the foam. In a box made of oak wood with internal dimensions of 191×197×197 mm and allowing sealing without leaking out the debris, 24 cubes made of oak wood dried at room temperature with a specific gravity of 0.65 and with an edge length of 19±0.8 mm and 12 specimens are loaded, followed by rotation of the oak box at a velocity of 60±2 rpm for 600±3 cycles. After rotation, the content of the box is poured on a mesh with nominal dimension of 9.5 mm to sieve off the debris. The weight of the residual specimens is measured. The reduction in the weight from the weight of the specimens before the test is measured and taken as the brittleness. The measurement is performed according to JIS A 9511.

The compressive strength is measured with a strain of 0.05 according to JIS K 7220.

Checking of the contents of the foaming agent and fluoroamine in the phenol foam is performed as follows:

After a specimen measuring 200×200×(thickness) mm is kept at standard temperature level 3 (temperature of 23±5° C.) and at standard humidity level 3 (40–70% RH) for 16 h or longer, the surface agent [sic; surface layer] is removed and is cut to pieces measuring 20×20×(thickness) mm, and the weight is accurately measured. The specimen is then crushed in a gas-tight container. After crushing, nitrogen or air is fed at a rate of 100 cc/min and in a volume 5 times that of the sealed container from one port of the gas-tight container. From the other port of the container, the gas is fed to a trap containing pyridine, toluene, DMF, or other solvent to extract the foaming agent. Then, the foaming agent absorbed in the solvent is quantitatively analyzed by gas chromatography. If needed, the components separated by gas chromatography are fed into a mass spectroscope to determine the molecular structure. Then, the weight of the sample powder after flowing of the gas is measured precisely. From the difference between it and the weight before the crushing, the gas weight is obtained. Determination of perfluorotrialkylamine is performed as follows: The crushed sample is dipped in a solvent selected from pyridine, toluene, DMF, etc., to extract fluoroamine, followed by gas chromatography or liquid chromatography. If needed, the components selected by gas chromatography may be fed into a mass spectroscope to determine the molecular structure [sic]. Or, the extracted components may be identified continuously by means of LC-IR (liquid chromatography-IR absorptive spectrometer).

MODE(S) FOR CARRYING OUT THE INVENTION

In the following, this invention will be explained in more detail with reference to application examples and comparative examples.

(A) Preparation of Resol Resin 5000 g of 37% formalin (guaranteed grade, product of Wako Pure Chemical Co., Ltd.) and 3000 g of 99% phenol (guaranteed grade, product of Wako Pure Chemical Co., Ltd.) were loaded in a reactor and stirred by a rotary propeller stirrer, with the temperature of the solution inside the reactor adjusted to 40° C. by a temperature adjustor. Then, 60 g of 50% aqueous solution of sodium hydroxide were added, and the reaction solution was heated from 40° C. to 85° C. and was kept [at 85° C.] for 110 min. Subsequently, the reaction solution was cooled down to 5° C., and it was taken as resol resin A-1.

On the other hand, in another reactor, 1080 g of 37% formalin, 1000 g of water, and 78 g of 50% aqueous solution of sodium hydroxide were loaded, followed by addition of 1600 g of urea (guaranteed grade, product of Wako Pure Chemical Co., Ltd.). The content was stirred by a rotary propeller stirrer, with the temperature of the solution inside the reactor adjusted to 40° C. by a temperature adjustor. Then, the reaction solution was heated from 40° C. to 75° C. and was kept [at 70° C.] for 60 min. It was taken as methylolurea U.

Subsequently, 1350 g of methylol urea U were mixed with resol resin A-1, the mixture solution was heated to 60° C., at which the solution was maintained for 1 h. Then, the reaction solution was cooled to 30° C. and neutralized to pH 6 by 50% aqueous solution of p-toluenesulfonic acid monohydride. The reaction solution was subjected to dehydration processing at 60° C., and the viscosity was measured. It was found that the viscosity at 40° C. was 6700 cps. It was taken as resol resin A.

(B) Preparation of Resol Resin 4350 g of 37% formalin and 3000 g of 99% phenol were loaded in a reactor and stirred by a rotary propeller stirrer, with the temperature of the solution inside the reactor adjusted to 50° C. by a temperature adjustor. Then, 60 g of 50% aqueous solution of sodium hydroxide were added, and the reaction solution was heated from 50° C. to 55° C. and kept [at 55° C.] for 20 min. Subsequently, the reaction solution was heated to 85° C. and kept at 85° C. for 115 min. Then, the reaction solution was cooled down to 30° C., and the pH was adjusted to 6 by 50% aqueous solution of p-toluenesulfonic acid monohydride. The reaction solution was subjected to dehydration processing at 60° C., and the viscosity was measured. It was found that the viscosity at 40° C. was 5800 cps. It was taken as resol resin B.

APPLICATION EXAMPLE 1

Paintad [transliteration] 32 (a surfactant manufactured by Dow Corning Asia Co., Ltd.) in an amount of 3.5 g for each 100 g of resol resin A was dissolved [in resol resin A]. The resol resin mixture was mixed with a foaming agent made of a mixture of 96.7 wt % of isopentane (product of Wako Pure Chemical Co., Ltd., with purity of 99% or higher), 3 wt % of Fluorinate FC-71 (product of 3M Co.), and 0.3 wt % of nitrogen, as well as a curing catalyst made of a mixture of 60 wt % of p-toluenesulfonic acid monohydride (purity of 95% or higher, product of Wako Pure. Chemical Co., Ltd.) and 40 wt % of diethylene glycol (purity of 98% or higher, product of Wako Pure Chemical Co., Ltd.), with a composition of 100:7:13 parts by weight of the resin mixture, foaming agent, and curing catalyst, respectively, and the mixture was fed to a pin mixer equipped with a thermostatted jacket. The mixture output from the mixer was blown into a mold lined with Spanbond [transliteration] E1040 (nonwoven fabric manufactured by Asahi Chemical Industries, Ltd.), followed by keeping in an oven at 80° C. for 5 h to manufacture a phenol foam.

APPLICATION EXAMPLE 2

Phenol foam was manufactured in the same way as in Application Example 1, except that the foaming agent was changed to a mixture of 79.7 wt % of isopentane, 20.0 wt % of Fluorinate FC-71, and 0.3 wt % of nitrogen, and that the amount of the foaming agent was changed to 8.5 parts by weight.

APPLICATION EXAMPLE 3

Phenol foam was manufactured in the same way as in Application Example 1, except that 5 wt % of Fluorinate FC-71 was dissolved in the resin mixture and the foaming agent was changed to a mixture of 99.7 wt % of isopentane and 0.3 wt % of nitrogen.

APPLICATION EXAMPLE 4

Phenol foam was manufactured in the same way as in Application Example 1, except that the foaming agent was changed to a mixture of 99.5 wt % of isopentane, 0.2 wt % of Fluorinate FC-71, and 0.3 wt % of nitrogen.

APPLICATION EXAMPLE 5

Phenol foam was manufactured in the same way as in Application Example 1, except that resol resin B was used in place of resol resin A, and the foaming agent was changed to a mixture of 93.7 wt % of isopentane, 7 wt % of Fluorinate FC-71, and 0.3 wt % of nitrogen.

APPLICATION EXAMPLE 6

Phenol foam was manufactured in the same way as in Application Example 1, except that the foaming agent was changed to a mixture of 89.7 wt % of n-pentane (guaranteed grade, product of Wako Pure Chemical Co., Ltd.), 10 wt % of Fluorinate FC-71, and 0.3 wt % of nitrogen, and that the amount of the foaming agent was changed to 7.7 parts by weight.

APPLICATION EXAMPLE 7

Phenol foam was manufactured in the same way as in Application Example 1, except that the foaming agent was changed to a mixture of 97.7 wt % of n-butane, 2 wt % of Fluorinate FC-71, and 0.3 wt % of nitrogen, and the amount of the foaming agent was changed to 5 parts by weight.

APPLICATION EXAMPLE 8

Phenol foam was manufactured in the same way as in Application Example 1, except that the foaming agent was changed to a mixture of 98.7 wt % of isopentane, 1 wt % of Fluorinate FC-71, and 0.3 wt % of nitrogen, and the amount of the foaming agent was changed to 5 parts by weight.

APPLICATION EXAMPLE 9

Phenol foam was manufactured in the same way as in Application Example 1, except that the foaming agent was changed to a mixture of 96.7 wt % of isopentane, 3 wt % of Fluorinate FC-70, and 0.3 wt % of nitrogen.

APPLICATION EXAMPLE 10

Phenol foam was manufactured in the same way as in Application Example 1, except that the amount of the foaming agent was changed to 13 parts by weight.

COMPARATIVE EXAMPLE 1

Phenol foam was manufactured in the same way as in Application Example 1, except that 15 wt % (with respect to the resin mixture) of Fluorinate FC-71 was dissolved in the resol resin mixture, and the foaming agent was changed to a mixture of 99.7 wt % of isopentane and 0.3 wt % of nitrogen.

COMPARATIVE EXAMPLE 2

Phenol foam was manufactured in the same way as in Application Example 1, except that the foaming agent was changed to a mixture of 99.7 wt % of isopentane and 0.3 wt % of nitrogen.

COMPARATIVE EXAMPLE 3

Phenol foam was manufactured in the same way as in Application Example 1, except that the foaming agent was changed to a mixture of 99.6 wt % of isopentane, 0.1 wt % of Fluorinate FC-71, and 0.3 wt % of nitrogen.

COMPARATIVE EXAMPLE 4

Phenol foam was manufactured in the same way as in Application Example 1, except that the foaming agent was changed to a mixture of 99.7 wt % of isopentane and 0.3 wt % of nitrogen, and that the amount of the foaming agent was changed to 13 parts by weight.

COMPARATIVE EXAMPLE 5

Phenol foam was manufactured in the same way as in Application Example 1, except that resol resin B was used in place of resol resin A, and that the foaming agent was changed to a mixture of 99.7 wt % of isopentane and 0.3 wt % of nitrogen.

In the phenol foam samples prepared in the aforementioned application examples and comparative examples, the feed resin, independent porosity, average pore size, and thermal conductivity, as well as the fluoroamine content, density, brittleness, and compressive strength of the foam are listed in Table I.

TABLE I

| | Resin | Independent Porosity (%) | Average Pore Size (μm) | Thermal Conductivity (kcal/mhr° C.) | Amount of Fluoroamine in the Foam (%) | Proportion of Gas by Weight (%) | Density (kg/m³) | Brittleness (%) | Compressive Strength (kg/cm²) |
|---|---|---|---|---|---|---|---|---|---|
| Appl. Ex. 1 | A | 91.1 | 88 | 0.0178 | 0.191 | 4.1 | 35 | 12 | 2.4 |
| Appl. Ex. 2 | A | 90.4 | 95 | 0.0180 | 1.247 | 4.2 | 35 | 19 | 2.3 |
| Appl. Ex. 3 | A | 92.1 | 103 | 0.0188 | 4.271 | 4.4 | 34 | 21 | 2.2 |
| Appl. Ex. 4 | A | 87.6 | 140 | 0.0228 | 0.013 | 4.2 | 34 | 26 | 2.2 |
| Appl. Ex. 5 | B | 86.4 | 124 | 0.0208 | 0.442 | 3.7 | 34 | 24 | 2.3 |
| Appl. Ex. 6 | A | 88.3 | 131 | 0.0217 | 0.621 | 4.2 | 34 | 15 | 2.3 |
| Appl. Ex. 7 | A | 89.2 | 127 | 0.0186 | 0.091 | 3.8 | 33 | 19 | 2.1 |
| Appl. Ex. 8 | A | 90.1 | 143 | 0.0188 | 0.043 | 3.8 | 33 | 21 | 2.2 |
| Appl. Ex. 9 | A | 92.1 | 106 | 0.0185 | 0.189 | 4.3 | 35 | 19 | 2.3 |
| Appl. Ex. 10 | A | 91.0 | 134 | 0.0180 | 0.332 | 7.7 | 20 | 28 | 0.80 |
| Comp. Ex. 1 | A | 76.3 | 162 | 0.0257 | 11.72 | 3.6 | 35 | 36 | 1.7 |
| Comp. Ex. 2 | A | 74.6 | 152 | 0.0264 | 0 | 35 | 35 | 38 | 1.6 |
| Comp. Ex. 3 | A | 77.6 | 155 | 0.0263 | 0.006 | 3.6 | 34 | 36 | 1.7 |
| Comp. Ex. 4 | A | 68.1 | 185 | 0.0270 | 0 | 5.2 | 20 | 47 | 0.04 |
| Comp. Ex. 5 | B | 72.1 | 165 | 0.0262 | 0 | 3.4 | 35 | 41 | 1.3 |

EFFECTS OF THE INVENTION

The phenol foam of this invention has excellent heat-insulating performnance, high compressive strength and other mechanical strengths, and significantly improved surface brittleness. The foaming agent used in this invention does not harm the ozonosphere, and has a small coefficient for the earth greenhouse effect. Consequently, the phenol foam of this invention is a type of heat-insulating construction material friendly to the environment of the earth.

What is claimed is:

1. A type of phenol resin foam heat-insulating material, characterized by the following facts: the phenol foam has an independent porosity of at least 80%, an average pore size in the range of 10–400 mm, and a thermal conductivity of 0.025 kcal/mhr° C. or lower; the phenol foam is composed of a portion of pores filled with a gas containing $C_{4-6}$ saturated hydrocarbon and a resin portion made of a phenol resin containing 0.01–5 wt % of at least one type of fluoroamine represented by the following formula (1):

$$(C_aF_b)_3N \qquad (1)$$

In formula (1), a is a natural number of 4 or larger and b is 2a+1.

2. The phenol resin foam heat-insulating material described in claim 1, characterized by the fact that the weight of the gas filled in the portion of pores is in the range of 2–35 wt % of the phenol foam.

3. The phenol foam described in claim 1 or 2, characterized by the fact that the phenol foam has a density in the range of 10–70 kg/m³, a brittleness of 30% or smaller, and a compressive strength meeting the relationship shown in formula (2) with respect to the density:

$$\text{compressive strength (kg/cm}^2\text{)} \geq \text{density (kg/m}^3\text{)} \times 0.1164 - 2.5 \qquad (2).$$

* * * * *